United States Patent [19]

Lund

[11] Patent Number: 5,018,779

[45] Date of Patent: May 28, 1991

[54] CAB FAIRING

[75] Inventor: David M. Lund, Coon Rapids, Minn.

[73] Assignee: Lund Industries, Incorporated, Minneapolis, Minn.

[21] Appl. No.: 420,655

[22] Filed: Oct. 17, 1989

[51] Int. Cl.⁵ .............................................. B62D 35/00
[52] U.S. Cl. .................................. 296/180.1; 296/91; 296/180.2; D12/156
[58] Field of Search ................. 296/180.1, 180.2, 91; D12/156, 181

[56] References Cited

U.S. PATENT DOCUMENTS

| D. 281,487 | 11/1985 | Chapman . | |
|---|---|---|---|
| D. 286,143 | 10/1986 | Lund . | |
| D. 294,242 | 2/1988 | O'Neill . | |
| D. 295,084 | 4/1988 | Weber . | |
| 1,275,400 | 8/1918 | Crowell . | |
| 4,159,843 | 7/1979 | Crossman | 296/91 |
| 4,318,565 | 5/1982 | Lay . | |
| 4,707,014 | 11/1987 | Rich | 296/180.1 |
| 4,883,307 | 11/1989 | Hacker et al. | 296/180.2 |

OTHER PUBLICATIONS

*Motor Trend*, Apr. 1979, p. 36.

*Primary Examiner*—Robert R. Song
*Attorney, Agent, or Firm*—Merchant, Gould, Smith, Edell, Welter & Schmidt

[57] ABSTRACT

A streamlined truck cab fairing (15) for use with a pickup truck which may be mounted on the truck cab (1) without interfering with the operation of a truck bed cover. The fairing (15) includes a left panel (17) a central member (16) and a right panel (18), the lower edges (20,22) of the fairing (15) being remotely spaced from the sidewalls (14) of the truck bed, thereby forming a gap (59) through which a sheetlike cover may pass to completely seal off the truck bed region. A plurality of air inlets (29,30,31) cost the relative wind to create a reaction force pressing the fairing (15) towards the truck. A side panel reinforcing member (48) is used to reduced vibration of the fairing side panels (17,18).

21 Claims, 7 Drawing Sheets

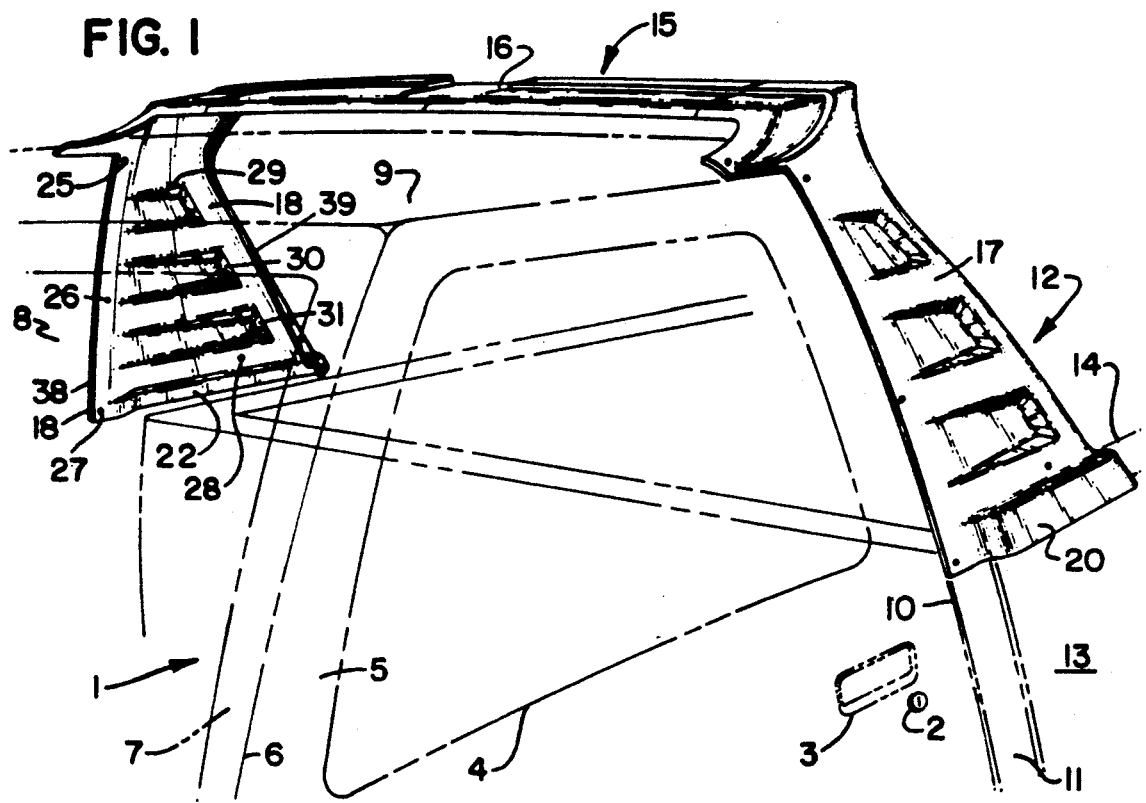
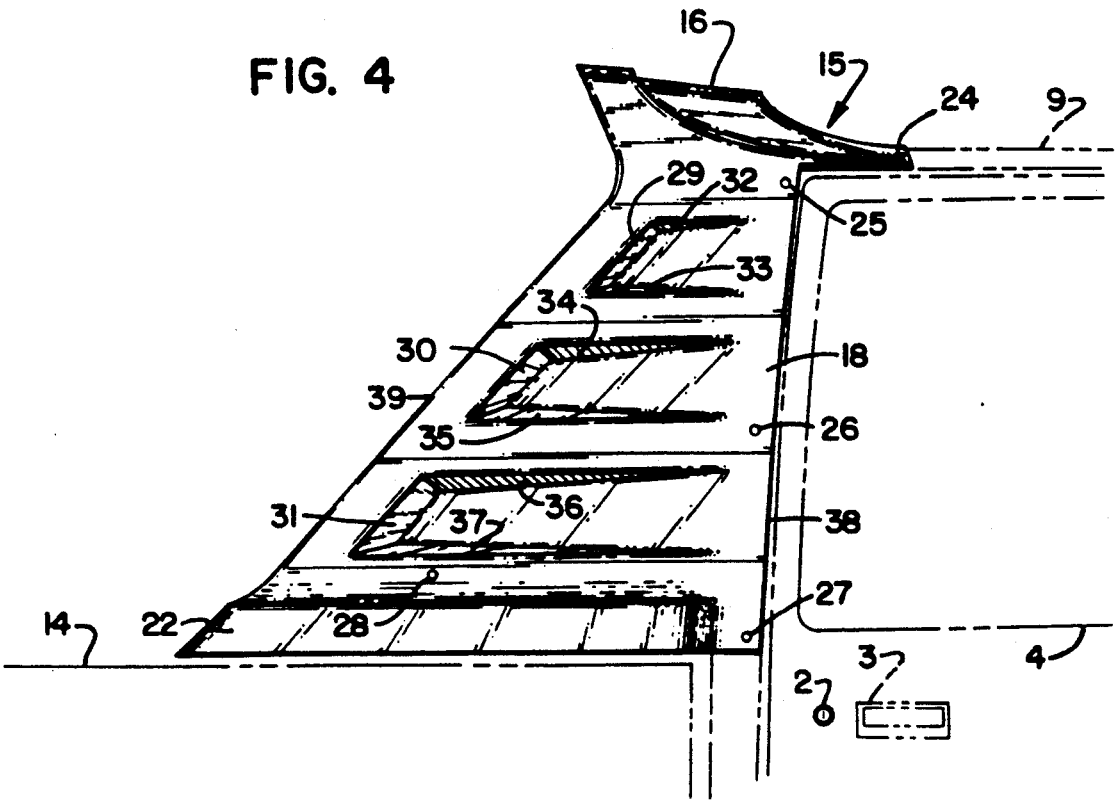

CAB FAIRING

BACKGROUND OF THE INVENTION

1. Field of the Invention

This invention relates generally to motor vehicle accessories and more particularly to an improved apparatus and method of providing an air spoiler or cab fairing which may be mounted over the cab, or passenger compartment, of a pickup truck.

2. Description of the Related Technology

The cab portion of a conventional pickup truck typically has a rectangular appearance and a depth sufficient only to accommodate the comfortable seating of passengers. In order to maximize the cargo capacity in the pickup truck bed or "box", the cab typically terminates in a near vertical wall immediately behind the passenger seats. Although this arrangement tends to maximize the available cargo carrying space within the bed of the pickup truck, the rectangular cab structure projecting abruptly into the air stream tends to create a high drag force as the vehicle travels along the road.

In an effort to more smoothly direct the flow of air over the cab of the pickup truck, numerous streamlined fairing shapes have been proposed to reduce drag and improve vehicle mileage. These devices can also be decorative. Additional advantages include the reduction of air turbulence within the truck box, protection of the cargo carried within the box, and increased surface area of the vehicle roof so as to permit the mounting of lights, antennas or horns. Such fairings can also partially block the sun in order to keep the cab interior cooler and reduce glare. Unfortunately, such fairings or spoilers are seldom included in pickup trucks as they leave the factory, and so the device must be retrofitted to existing vehicles.

In the past, spoilers and fairings have typically been mounted by connecting the spoiler to both the cab and the truck box. This mounting arrangement presents several problems. First, mounting of the device is complicated since alignment between the mounting structures on the cab and on the truck box must be perfectly matched in order to fit properly with the fairing structure. Second, the cab and the box often behave as two discrete structures. Any differential movement between these two structures can result in cracking or warping of the fairing if the fairing is rigidly attached to both regions of the truck. Finally, the traditional mounting arrangement prevents the use of a conventional truck box cover since the cover is typically attached to the truck box in the same region in which the fairing is mounted. This creates the necessity of constructing a custom truck box cover, or more frequently, utilizing an existing truck box cover but failing to fasten it completely in the area behind the cab. This defeats the purpose of the box cover insofar as it permits moisture, sunlight and dust to enter the otherwise protected cargo area.

Examples of conventional pickup truck fairings and covers are shown, for example, in U.S. Design Pat. No. 281,487, issued to Chapman, in which the faired rear portion of the cab abuts the box cover. The fairing shown in the '487 patent could not be easily retrofitted to an existing vehicle, since it would require substantial modification of the body of the cab. U.S. Design Pat. No. 286,143, issued to Lund discloses an air spoiler for pickup trucks which may be easily retrofitted to an existing cab. However, the '143 design interferes with the perimeter of the existing truck box and would, therefore, make the use of an existing box cover impossible.

U.S. Design Pat. No. 294,242, issued to O'Neill shows a truck cover incorporating fairing arrangement, in which the fairing and the cover must be custom designed to fit together. Note that the truck cover abuts the fairing, with the fairing also serving as a portion of the cover itself.

U.S. Design Pat. No. 295,084, issued to Weber, depicts a retrofittable spoiler which supports a light bar. The mounting arrangement involves fastening a light bar directly to the sidewalls of the truck box, thereby requiring the use of a custom made cover for the box.

SUMMARY OF THE INVENTION

The present invention addresses some of the shortcomings of previous cab fairings by providing a novel structure which mounts only to the pickup truck cab. Any number of convenient mounting methods maybe used to rigidly attach the fairing to the cab, such as drilling a plurality of holes within the cab and attaching the fairing structure by means of traditional nuts and bolts. The use of rivets, welds, adhesives, magnets, or flexible mounts could also be adapted to secure the present invention to a truck cab. The fairings include two substantially vertical side portions which extend rearwardly of the cab and which approach the sides of the truck box. Unlike previous devices, however, the fairing does not join the sides of the truck box, but rather a small space or gap is preserved in order that a conventional box cover may be attached along the entire perimeter of the truck bed without interference from the fairing structure. Additionally, in order to prevent vibration or unwanted deformations of the fairing, structural members are employed which stiffen and stabilize the fairing. These structural members are attached directly to the cab rather than to the truck bed or any portion of the cargo holding area.

BRIEF DESCRIPTION OF THE DRAWINGS

FIG. 1 is a perspective view of a fairing constructed according to the principles of the present invention, with the truck upon which the fairing is mounted shown in phantom;

FIG. 4 is a side elevation of a fairing as shown in FIG. 1;

DETAILED DESCRIPTION OF THE PREFERRED EMBODIMENTS

Figure 2:
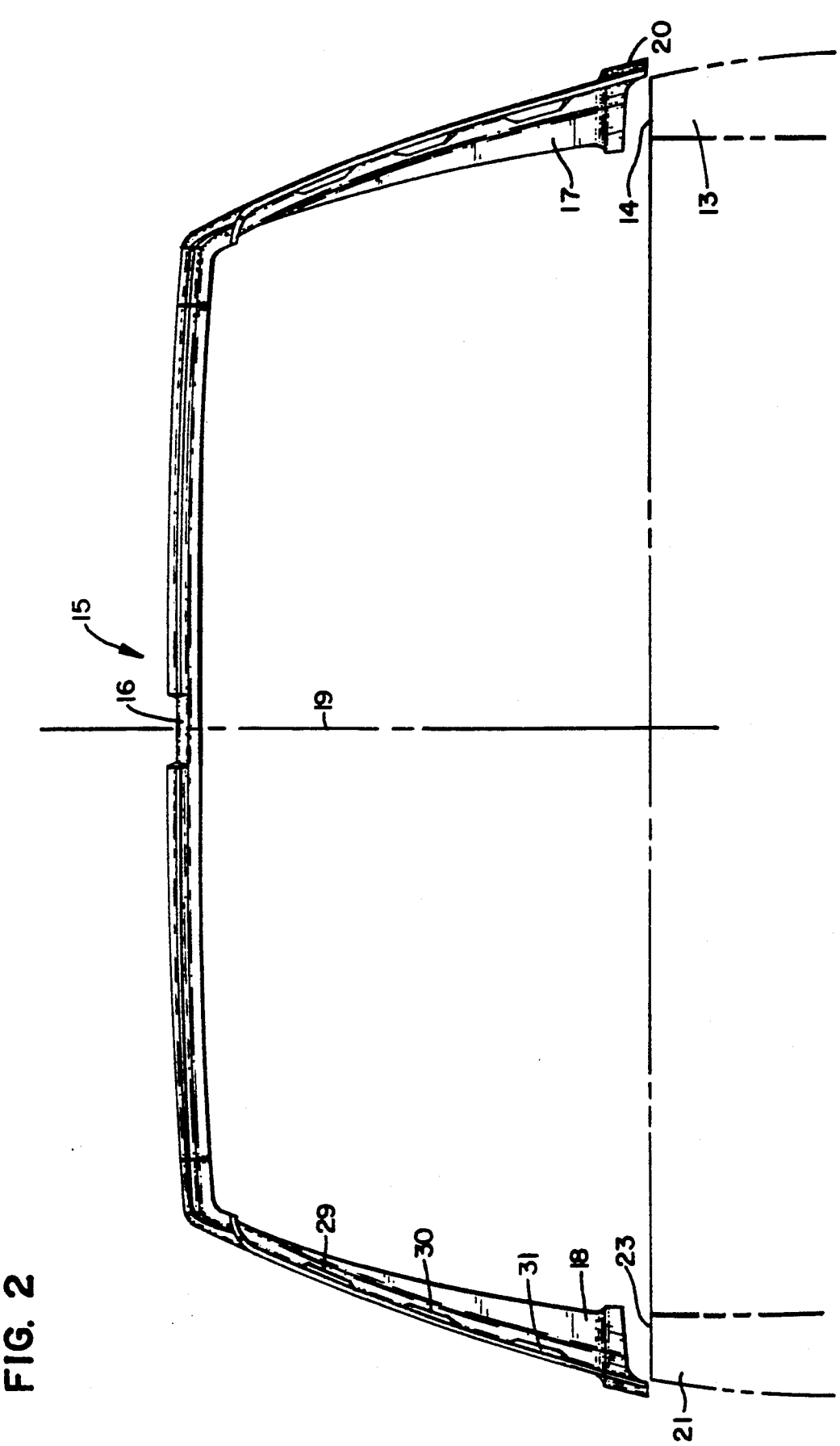
FIG. 2 is a front elevation of a fairing as shown in FIG. 1.

Referring particularly to FIG. 1, a partial view of a truck cab 1 is showed in phantom. The portion visible in the figure would typically be the driver's side, with lock 2 being adjacent to door handle 3, both of which are somewhat below window 4. The door 5 is typically mounted on hinges (not shown) which connects the forward perimeter 6 of door 5 to pillar 7, the pillar 7 also serving as a support for windshield 8 and cab roof 9.

The rear perimeter 10 of door 5 abuts bulkhead 11 of truck cab 1. Immediately, adjacent into the rear of bulkhead 11 is the truck bed or "box" 12 which includes a left side wall 13 having a top rail 14.

The cab fairing of the present invention is shown generally at 15. Although the fairing may take a variety of specific forms, the fairing 15 would generally include a central bar 16 which spans the portion of fairing 15 between left panel 17 and right panel 18. As seen in FIG. 2, a preferred embodiment may be symmetrical with respect to a vertical axis 19, but this does not necessarily have to be the case. Also observable in FIG. 2 is the relatively small frontal area of fairing 15, thereby projecting a relatively low profile surface to be encountered by the relative wind passing over truck cab 1.

Figure 3:
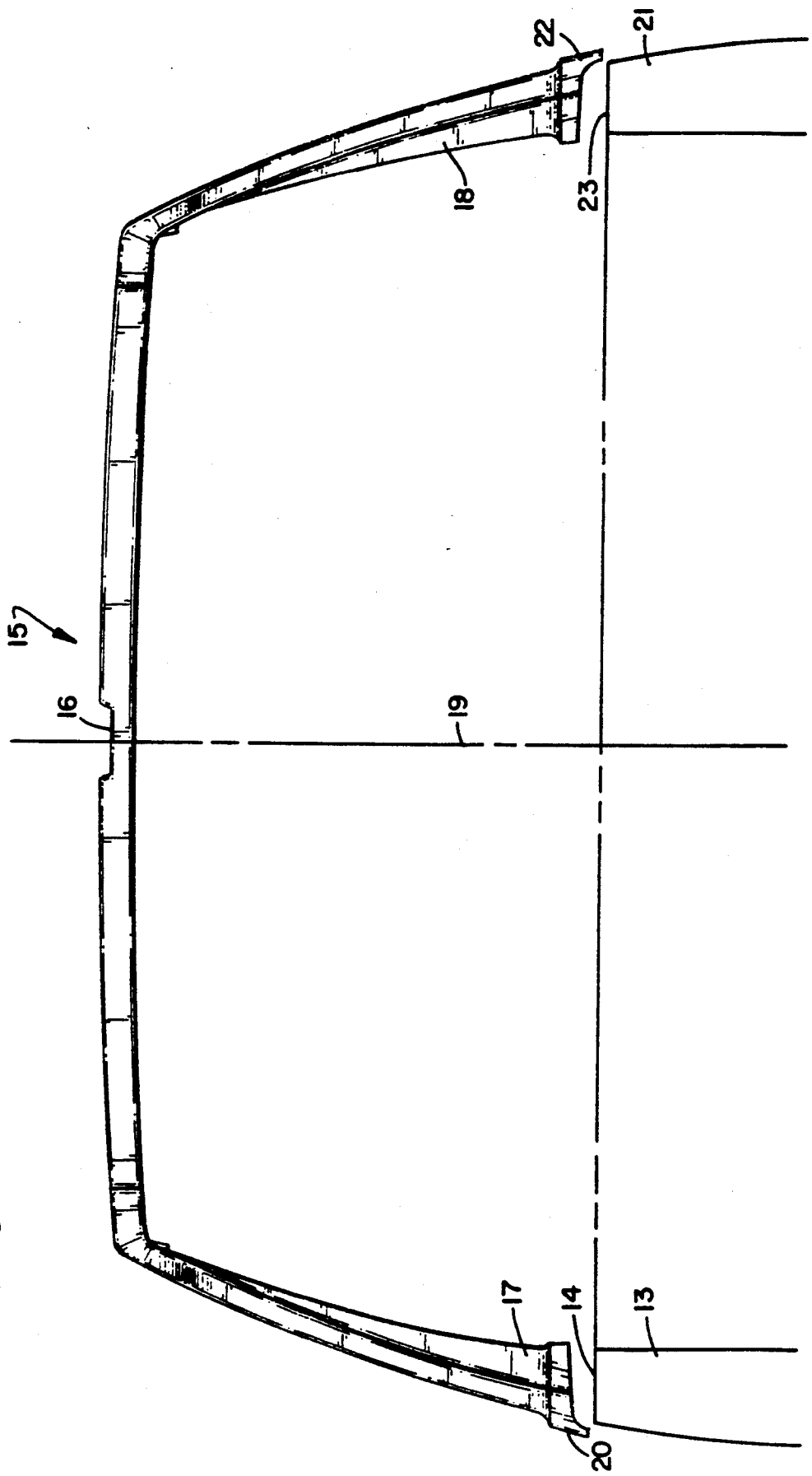
FIG. 3 is a rear elevation of a fairing as depicted in FIG. 1, showing one form of mounting and stiffening.

As seen in FIG. 3, left side wall 13 of truck bed 12 resides beneath the lower portion of left side wall 17. Left lip 20 projects vertically below the surface level of top rail 14, thereby providing additional protection from wind, rain and dust entering the truck bed 12. Due to the symmetry of fairing 15, a similar structure exists on the right hand side of the truck with right top rail 21 residing beneath right lip 22, with right lip 22 projecting somewhat below the horizontal surface of right rail top 23 of right side wall 21. A small gap exists between the bottom of right panel 18 and the top of right rail 23 of right side wall 21, the distance of the gap not being critical and typically varying between $\frac{1}{8}$ of an inch and 3 inches. The length of the lip 22 should in most cases be sufficient to overlap side wall 21, and in the preferred embodiment could have a length varying between $\frac{1}{2}$ inch and $3\frac{1}{2}$ inches.

Referring particularly to FIGS. 1 and 4, the right side wall 18 of fairing 15 is shown. The fairing 15 is affixed to cab roof 9 by means of mounting hole 24. A series of mounting holes 25, 26 and 27 are used to secure right side wall 18 to cab 1 in the region behind door 5. An additional mounting hole 28 secures a strut (not shown) which is connected to the cab so as to stabilize and prevent vibration of fairing 15. As best seen in FIG. 4, Inlets 29, 30 and 31 are formed within sidewall 18. The particular contours of inlets 29, 30 and 31 maybe chosen to satisfy aesthetic or decorative purposes, but the inlets also serve a useful function in preventing vibration of fairing 15. When the vehicle is in motion, air passing over right side wall 18 produces an area of low pressure over the outer surface of side wall 18, much as air passing over an aircraft wing creates an area of low pressure, since the air passing over the outer surface travels at a relatively high velocity whereas the air passing over the inner surface travels at a relatively low velocity. This low pressure force would tend to pull right side wall 18 away from the truck, that is, to "Bow out", the amount of force being proportional to the speed of the truck. In order to reduce this tendency, inlets 29, 30 and 31 cause air to press inwardly against inlet side walls 32, 33, 34, 35, 36 and 37, thereby producing a reaction force which presses the entire right side wall 18 inwardly.

Front edge 38 of right side wall 18 is formed so as to follow the contour of the rear surface of the truck cab 1, that is, to provide a shape which will permit mounting of fairing 15 but without interfering with the opening and closing of door 5. Typically, this would require that front wall 38 be substantially vertical. Rear wall 39 may be of any shape, but typically will slope at an approximate 45° angle towards the rear of the vehicle, terminating at lower lip 22. Typically, left side wall 17 is formed in a similar fashion.

Figure 5:
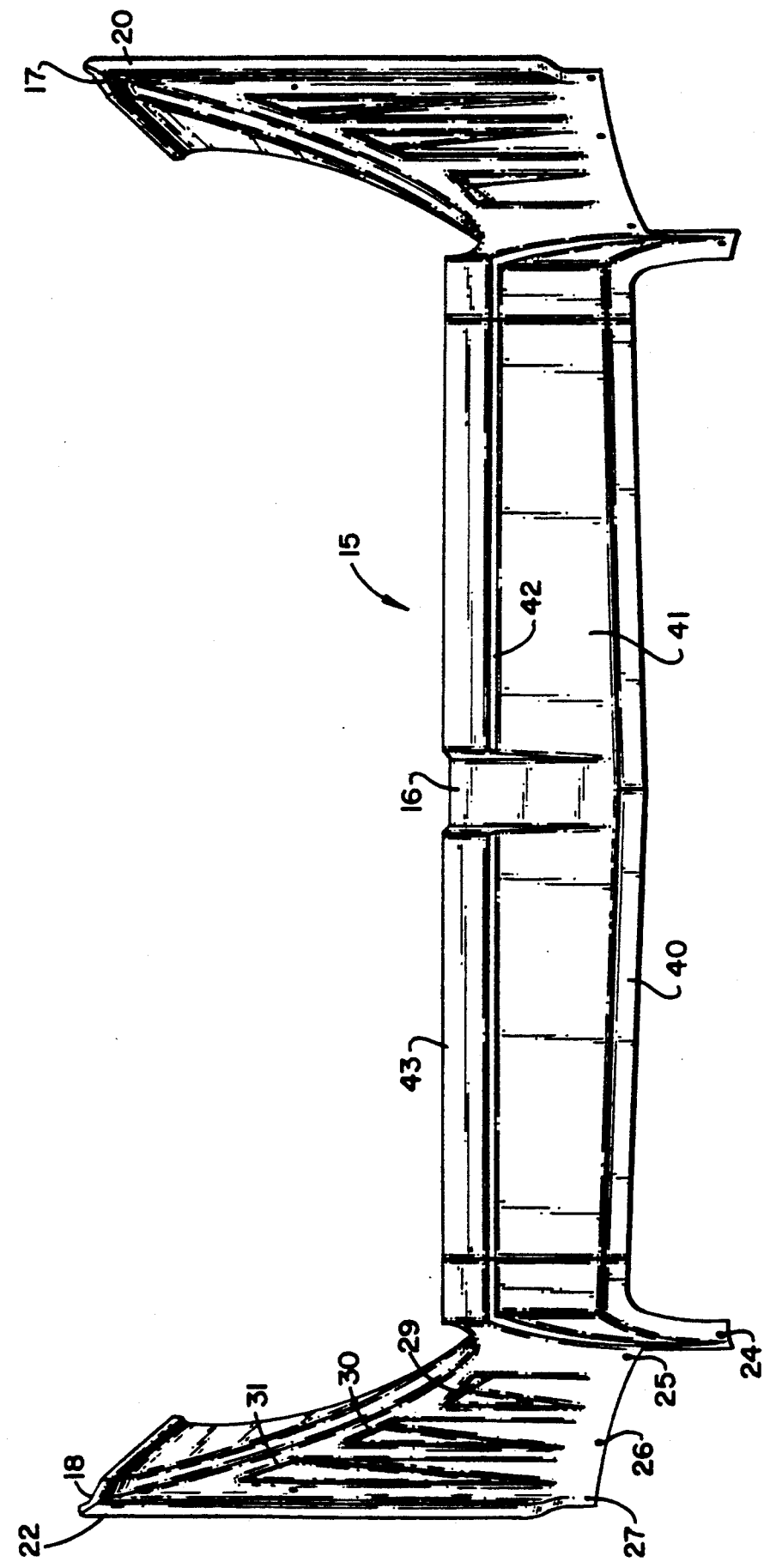
FIG. 5 is a top plan view of a fairing as shown in FIG. 1.

Referring particularly to FIG. 5, other aerodynamic and structural features of the fairing 15 may be observed. Central bar 16 is seen to include several surface contours, including a forward ramped portion 40, a substantially horizontal surface 41, a ramped transition area 42 and a rear platform 43. Since central bar 16 would tend to act as an air foil, creating lift, as the vehicle moves forward, ramped surface 40 and transition surface 42 tend to create a downward reaction force in response to the force of the air deflecting from them. Substantially horizontal surface 41 serves as a mounting area for accessories such as horns, lights and antennas. Rear platform 43 may be extended rearwardly as far as desired, serving to extend the surface area of cab roof 9 and thereby providing additional protection for box 12 (not shown).

Figure 6:
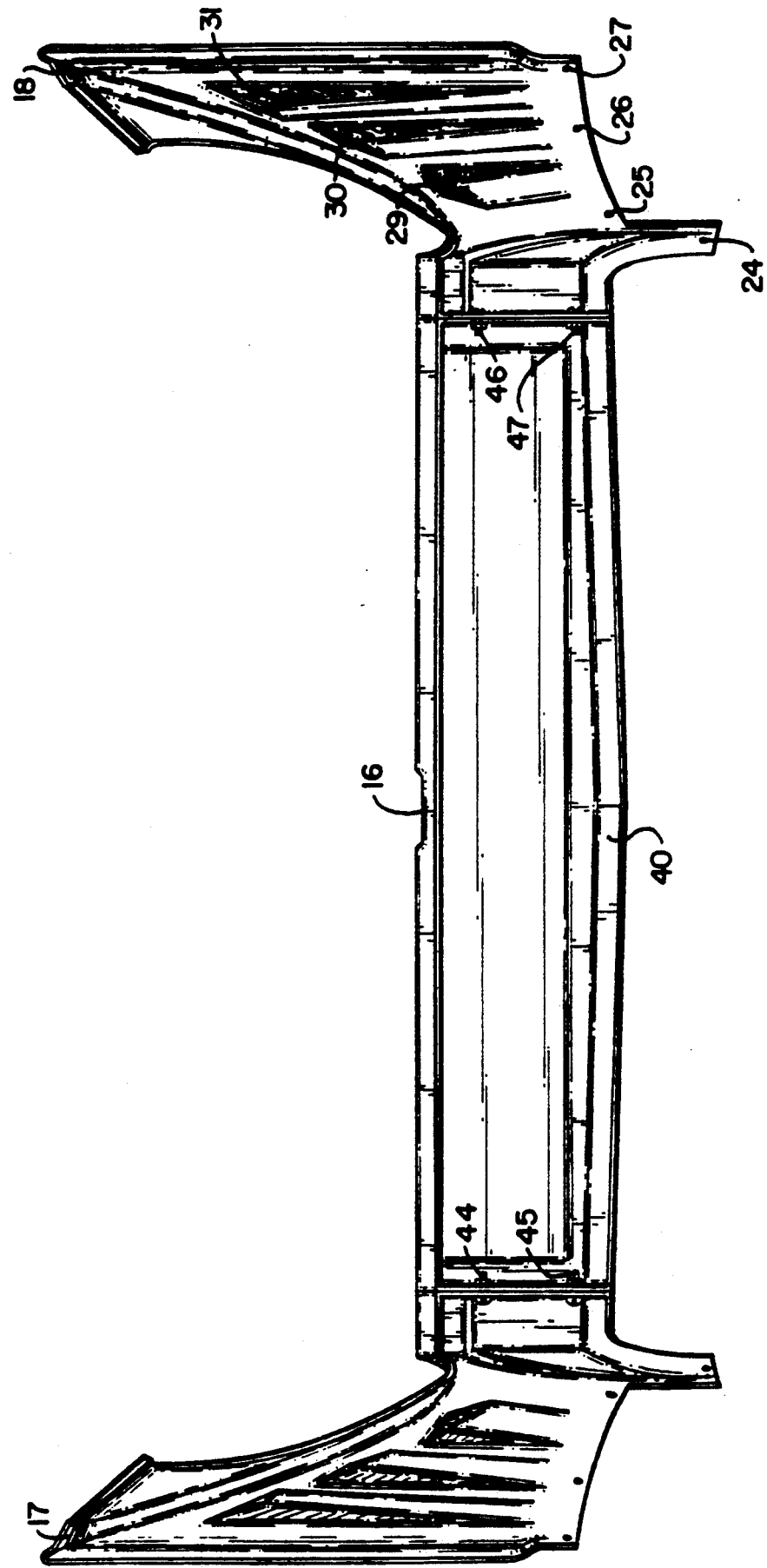
FIG. 6 is a bottom plan view of a fairing as shown in FIG. 1.
Figure 9:
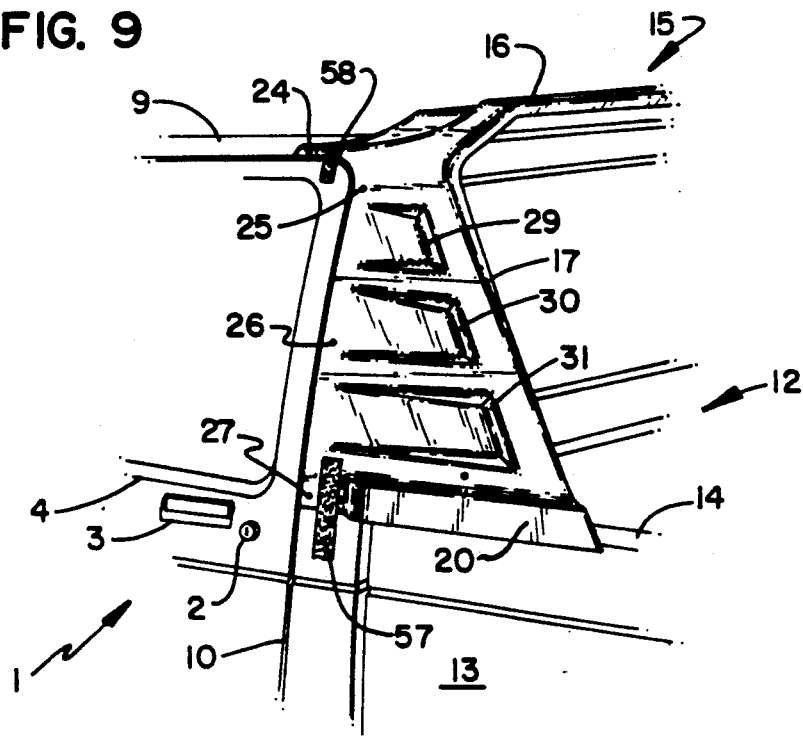
FIG. 9 is a partial perspective view of the fairing as depicted in FIG. 1, showing certain details of the installation process.
Figure 10:
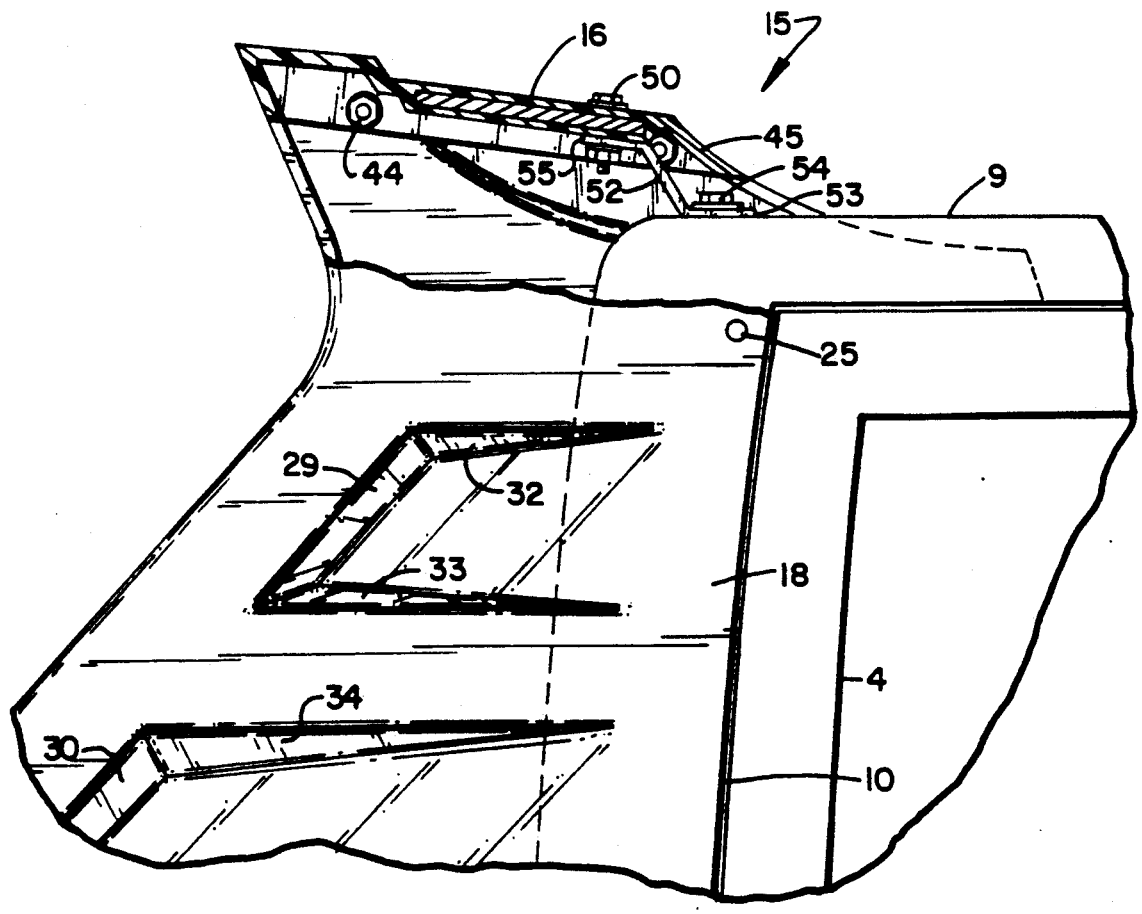
FIG. 10 is a partial right side elevation of the fairing as depicted in FIG. 1, showing a preferred method of supporting the central bar portion of the fairing.

The manner in which the central bar 16 is fastened to side wall 17 and 18 is best seen by referring to FIG. 6, 9 and 10. In order to simplify the field installation process, side wall 17 and 18 would first be mounted to truck cab 1. As seen in FIG. 9, left side wall 17 is temporarily held in place by tape segments 57 and 58, thereby permitting drilling of holes in cab 1 to align with mounting holes 24, 25, 26 and 27. A similar process is performed with right sidewall 18. Central Bar 16, which is formed as a separate piece, would then be fitted into position and bolted into place. In the preferred embodiment, $4\frac{1}{4}$ inch by 1 inch bolts are used as fasteners. Bolts 44 and 45 are used to fasten central bar 16 to left side wall 17, whereas bolts 46 and 47 are used to fasten central bar 16 to right side wall 18. In order to reinforce central bar 16, particularly when used as a light bar or horn support, a center support bracket 52 may be employed. A bottom end 53 of bracket 52 is fastened to cab roof 9 by means of bolt 54, whereas top end 55 of bracket 53 is affixed to a suitable mounting hole (not shown) in central bar 16 by means of bolt 56.

Figure 7:
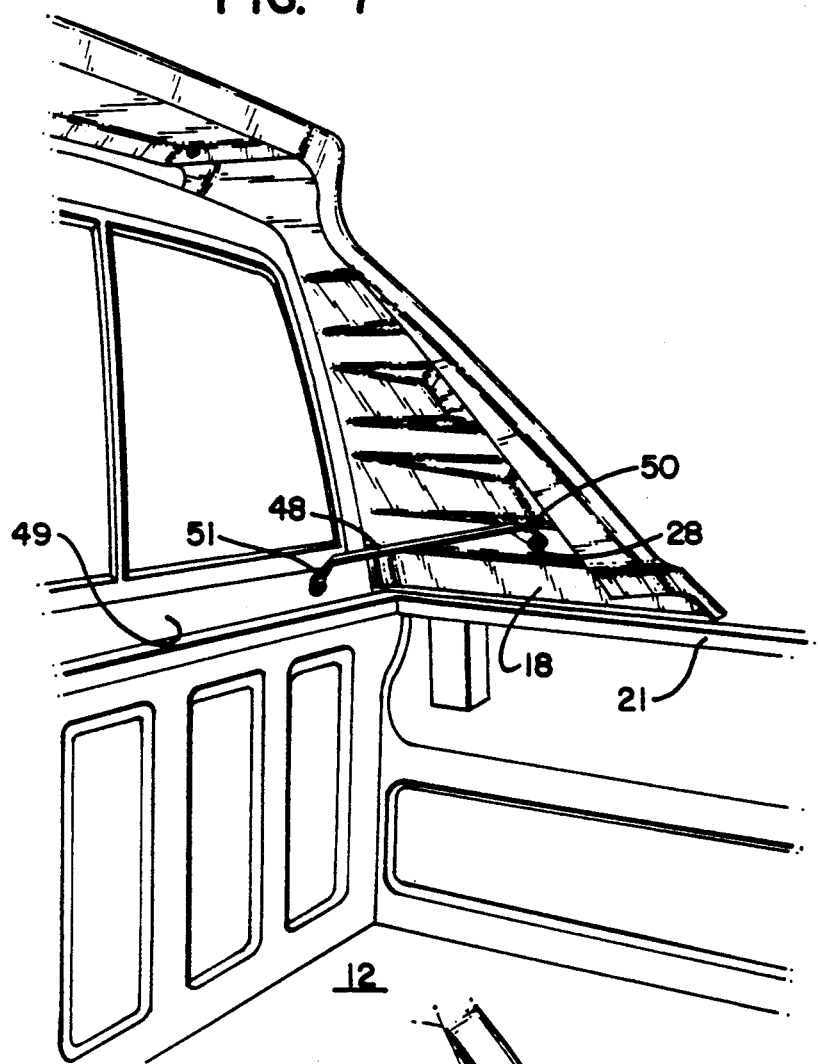
FIG. 7 is a perspective view showing details of the stiffening arrangement as utilized in a preferred embodiment of the fairing shown in FIG. 1.
Figure 8:
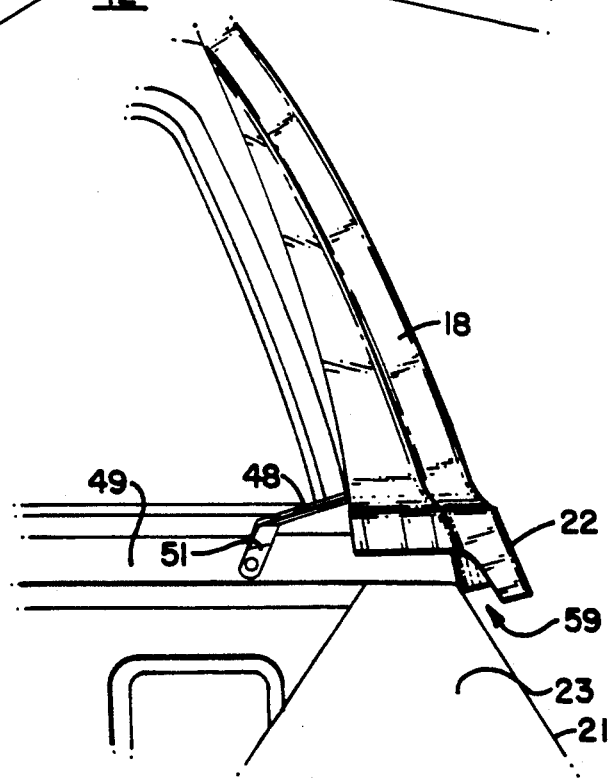
FIG. 8 is a partial rear elevation of a fairing as shown in FIG. 1, showing the relationship of a portion of the fairing with the truck box.

Referring particularly to FIGS. 7 and 8, the stabilizing arrangement utilized in the present invention can best be seen. In order to preserve the small gap 59 between, for example, right panel 18 and right side rail 21, a direct connection between right panel 18 and right side wall 21 is not possible. Since right panel 18 presents a relatively large surface exposed to the relative wind as the truck moves forward, some means of stabilizing or reinforcing right panel 18 is necessary. In the preferred embodiment, a strut or bracket 48 is rigidly affixed to right panel 18 and the rear surface 49 of truck cab 1. Bracket 48 may be formed in a variety of ways, but typically is a flat bar having a panel end 50 and a cab end 51. Each end 50 and 51 is bent so that it resides in a plane that is substantially parallel to the surface to which it is attached. A mounting hole is drilled in each end, with a hole in panel end 50 being aligned with mounting hole 28 in right panel 18. A mounting hole is drilled in rear surface 49 of truck cab 1 so as to align with a hole in cab end 51. In the preferred embodiment a 3/16 inch by ⅝ inch hex head bolt and "kep" nut is provided to fasten the panel end 50 of bracket 48 to right panel 18. A ¼ inch by ¾ inch self tapping bolt is used to fasten cab end 51 to rear surface 49.

Those skilled in the art will undoubtedly appreciate the various modifications and additions that may be made in the method and apparatus of the present invention without departing from the central features of novelty thereof, which are intended to be defined and secured by the appended claims.

I claim:

1. A fairing for use on a motor vehicle, comprising:
   a) A left panel;
   b) a right panel;
   c) a central bar, the central bar being rigidly affixed to the left panel and the right panel, thereby forming a structure surrounding a portion of the motor vehicle; and
   d) mounting means, the mounting means being located in a forward region of the fairing, thereby preserving a relatively unobstructed region behind and beneath the fairing.

2. The fairing of claim 1, further comprising:
   a) A left panel formed as a curved shell, the curved shell having a top portion, a bottom portion, a forward portion and a rearward portion;
   b) A right panel formed as a curved shell, the curved shell having a top portion, a bottom portion, a forward portion and a rearward portion; and
   c) a central bar formed with a left end and a right end, the left end of the central portion being rigidly affixed to the top portion of the left panel, the right end being rigidly affixed to the top portion of the right panel.

3. The fairing of claim 2, further comprising:
   a) The bottom portion of the right panel being formed as a lip, the lip being spaced apart from and overlapping a portion of the motor vehicle; and
   b) The bottom portion of the left panel being formed as a lip, the lip being spaced apart from and overlapping a portion of the motor vehicle, so as to protect a cargo storage region of the motor vehicle from contaminants and turbulence while being physically separated from every surface of the cargo storage region.

4. The fairing of claim 3, wherein the fairing is formed so as to spoil aerodynamic lift forces, the aerodynamic lift forces being generated by movement of the motor vehicle through air.

5. The fairing of claim 3, wherein the left panel and the right panel each further comprises:
   A plurality of mounting holes, the mounting holes being placed adjacent to an edge of the forward portion and the top portion, thereby permitting the use of shafted fasteners passing through the mounting holes and cooperatively aligned holes residing within the motor vehicle.

6. The fairing of claim 5, wherein the left panel and the right panel each further comprise:
   A plurality of inlet areas, each inlet area being substantially horizontally aligned, each inlet area being formed within the curved shell so as to have a shallow end and a deep end, the shallow end residing near the forward portion of the panel, the deep end residing near the rearward portion of the panel, thereby causing air passing over the curved shell to exert a force having a component directed toward the other panel.

7. The fairing of claim 6, further comprising central bar support means, the central bar support means being rigidly affixed to the central bar and being downwardly aligned so as to intercept an upper region of the motor vehicle, the central bar support means being rigidly affixed to the upper region of the motor vehicle.

8. The fairing of claim 7, further comprising a plurality of stiffening members, each stiffening member being rigidly attached to the motor vehicle at a point physically separate from the cargo storage region, each stiffening member being rigidly attached to the bottom portion of the panel.

9. A method of streamlining a truck cab having a truck bed surrounded by substantially vertical sidewalls comprising the step of mounting a fairing structure on the truck cab, the fairing structure being shaped so as to partially surround the truck cab, the fairing structure being physically separated from each vertical sidewall of the truck bed, the fairing structure being formed so as to have a left panel, a right panel and a central bar, the step of mounting the fairing structure on the truck cab comprising the steps of:
   a) fastening the left panel to a first region of the truck cab;
   b) fastening the right panel to a second region of the truck cab;
   c) a fixing a first end of the central bar to the left panel of the fairing structure; and
   d) a fixing a second end of the central bar to the right panel of the fairing structure, the central bar thereby spanning a distance between the left panel and the right panel so as to form a complete fairing structure.

10. The method of streamlining the truck cab of claim 9, further comprising the steps of:
    a) Positioning the left panel such that a portion of the left panel extends rearwardly from the truck cab; and
    b) Positioning the right panel such that a portion of the right panel extends rearwardly from the truck cab, the right panel and the left panel being substantially symmetrically positioned with respect to the truck cab longitudinal axis.

11. The method of streamlining the truck cab of claim 10, further comprising the steps of:
    a) Positioning the left panel such that the left panel is physically separated from an adjacent vertical sidewall surrounding the truck bed; and
    b) Positioning the right panel such that the right panel is physically separated from the adjacent vertical sidewall surrounding the truck bed.

12. The method of streamlining the truck cab of claim 11, further comprising the steps of:
    a) Positioning the left panel such that the left panel partially surrounds an upper region of an adjacent vertical sidewall of the truck bed, thereby creating a relatively small gap between the left panel and the vertical sidewall; and
    b) Positioning the right panel such that the right panel partially surrounds an upper region of an adjacent vertical sidewall of the truck bed, thereby creating a relatively small gap between the right panel and the vertical sidewall.

13. The method of streamlining the truck cab of claim 12, further comprising the step of reinforcing the left panel and the right panel, respectively, by means of a structural member extending from each panel to a rear portion of the truck cab.

14. The method of streamlining the truck cab of claim 13, further comprising the step of reinforcing the central bar by means of a structural member extending from the central bar to an upper portion of the truck cab.

15. A retrofittable pick up truck cab fairing device, for preserving the utility of a pick up truck bed cover comprising;
   a) a panel section which extends along at least a portion of a vertical side of a pick up truck cab, the panel section including a left side panel, a right side panel, and at least two lip structures, each lip structure being integrally formed as a lower portion of the right side panel and the left side panel respectively, each lip structure tending to partially surround an upper portion of a truck bed sidewall, each lip structure residing a slightly apart from the nearest upper portion of the truck bed sidewall;
   b) fastening means, the fastening means tending to rigidly affix the panel section to the pick up truck cab, the fastening means tending to support the panel section in a region remotely spaced from any perimeter portion of the pick up truck bed.

16. The truck cab fairing of claim 15, wherein the lip structure and the nearest upper portion of the truck bed sidewall define a gap, the gap being sufficiently wide to permit the passage of the truck bed cover.

17. The truck cab fairing of claim 15, further comprising at least two reinforcing members, each reinforcing member having a first end and a second end, the first end being rigidly affixed to a rear portion of the truck cab and the second end being rigidly affixed to a side panel.

18. The truck cab fairing of claim 17, wherein the panel section further comprises a central member, the central member extending between the left side panel and the right side panel, the central member extending rearwardly of the truck cab.

19. A pick up truck cab fairing comprising:
   a) a panel section exending along a vertical side of the pick up truck cab, the panel section including a lip structure, the lip structure being integrally formed as a lower portion of the side panel, the lip structure tending to partially surround an upper portion of a perimeter of a pick up truck bed, the lip structure residing slightly apart from the nearest perimeter portion of the truck bed;
   b) means for mounting the panel section to the pick up truck cab so that the panel section is remotely spaced from any perimeter portion of the pick up truck bed.

20. The pick up truck cab fairing of claim 19, wherein the lip structure and the nearest upper portion of the truck bed perimeter define a gap, the gap being sufficiently wide to permit the passage of a truck bed cover.

21. A pick up truck cab fairing comprising:
   a) a panel section extending along a vertical side of the pick up truck cab;
   a) a panel section extending along a vertical side of the pick up truck cab;
   b) means for mounting the panel section to the pick up truck cab so that the panel section is remotely spaced from any perimeter portion of a pick up truck bed; and
   c) a reinforcing member, the reinforcing member having a first end and a second end, the first end being rigidly affixed to the rear portion of the pick up truck cab and the second end being rigidly affixed to the panel section.

* * * * *